United States Patent [19]
Reed

[11] Patent Number: 5,499,470
[45] Date of Patent: Mar. 19, 1996

[54] FISHING LURE

[76] Inventor: Andrew J. Reed, Rte. 4, Box 380, Atlanta, Tex. 75551

[21] Appl. No.: 253,407

[22] Filed: Jun. 3, 1994

[51] Int. Cl.⁶ ................................................ A01K 85/00
[52] U.S. Cl. ...................... 43/42.13; 43/42.06; 43/42.14
[58] Field of Search .............................. 43/42.13, 42.14, 43/42.06, 42.11, 42.19, 42.16, 42.17, 42.18, 42.2, 42.44, 42.03, 42.15

[56] References Cited

U.S. PATENT DOCUMENTS

| | | | |
|---|---|---|---|
| 3,397,478 | 8/1968 | Lowes, Jr. | 43/42.31 |
| 3,546,804 | 12/1970 | Woolums | 43/42.11 |
| 4,510,710 | 4/1985 | Hanna et al. | 43/42.13 |
| 4,619,068 | 10/1986 | Wotawa . | |
| 4,625,448 | 12/1986 | Borders | 43/42.13 |
| 4,640,041 | 2/1987 | Stanley | 43/42.13 |
| 4,653,218 | 3/1987 | Margulis | 43/42.2 |
| 4,718,191 | 1/1988 | Gentry . | |
| 4,793,089 | 12/1988 | Long et al. . | |
| 4,901,470 | 2/1990 | Gentry | 43/42.13 |
| 5,201,784 | 4/1993 | McWilliams . | |
| 5,226,268 | 7/1993 | Sisson, Jr. | 43/42.13 |
| 5,400,542 | 3/1995 | Johnson | 43/42.13 |

OTHER PUBLICATIONS

Bass Pro Shop Outdoor World 1991 Catalog, p. 138.
Bassmaster Magazine Nov. 1991, p. 79.
Bassmaster 1994 Bass Fishing Guide, p. 92.

Primary Examiner—P. Austin Bradley
Assistant Examiner—Chuck Y. Mah
Attorney, Agent, or Firm—James E. Bradley; Mark W. Handley

[57] ABSTRACT

A spinner type of fishing lure is provided having a wire formed into first and second legs which both extend in a rearward direction. The first leg extends into a artificial minnow from which a hook extends, and about which a skirt is provided for concealing the hook. A spinner is rotatably secured about the second leg for rotating as the fishing lure is drawn through water. A clicker is secured to a portion of the second leg for swivelling about the second leg to repeatedly knock against the spinner as the spinner is rotating about the second leg, which produces a clicking noise for attracting fish. The spinner rotates about an axis of rotation which is rearwardly inclined away from the first leg for urging the fishing lure to submerge beneath the surface of the water. The portion of the second leg about which the spinner is secured extends rearwardly of a forward portion of the second leg, which prevents debris from becoming entangled with the spinner.

8 Claims, 1 Drawing Sheet

FISHING LURE

BACKGROUND OF THE INVENTION

1. Field of the Invention

The present invention relates to fishing lures, and in particular relates to spinner types of fishing lures.

2. Description of the Prior Art

Artificial fishing lures have been utilized for catching fish. Fishing lures have included an artificial minnow which is coupled to a spinner for drawing along the surface of a body of water to attract fish. Such fishing lures are described in U.S. Pat. No. 4,718,191, which was issued to Gentry on Jan. 12, 1988, and U.S. Pat. No. 4,793,089, which was issued to Long et al. on Dec. 27, 1988. Both the '191 patent and '089 patent disclose spinner baits that are designed for pulling along the surface of a body of water. However, during certain times of year fish are often found at depths which are well below the top surface of a body of water. During such times, surface type fishing lures are not effective for catching fish which are found at the deeper depths.

Additionally, other types of fishing lures have been utilized to provide noises for attracting fish. Such types of fishing lures for generating noises include U.S. Pat. No. 4,619,068, issued to Wotawa on Oct. 28, 1986, and U.S. Pat. No. 5,201,784, issued to McWilliams on Apr. 13, 1993. The '784 patent relies on members to oscillate, or wobble, as they are drawn through a body of water in order to generate noise and vibrations for attracting fish. Although effective in generating a rattle type of noise, the '784 patent does not provide a positively driven means, such as a spinner, for engaging another member to generate noise to attract fish.

Further, prior art fishing lures have included spinners which rotate around an outwardly disposed leg of the lure, such as the fishing lure shown in the '089 patent. Debris may often be caught by a rotating spinner and even wrap around the spinner blade as the spinner is rotating. Fishing lures of this type are frequently lost as a result of the fishing lure hanging-up on such debris.

SUMMARY OF THE INVENTION

A spinner type of fishing lure is provided having a wire formed into first and second legs which both extend in a rearward direction. The first leg extends into a artificial minnow from which a hook extends, and about which a skirt is provided for concealing the hook. A spinner is rotatably secured about the second leg for rotating as the fishing lure is drawn through water. A clicker is secured to a portion of the second leg for swivelling about the second leg to repeatedly knock against the spinner as the spinner is rotating about the second leg, which produces a clicking noise for attracting fish. The spinner rotates about an axis of rotation which is rearwardly inclined away from the first leg for urging the fishing lure to submerge beneath the surface of the water. The portion of the second leg about which the spinner is secured extends rearwardly of a forward portion of the second leg, which prevents debris from becoming entangled with the spinner.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawing, wherein:

DETAILED DESCRIPTION OF THE PREFERRED EMBODIMENT

Figure 1:
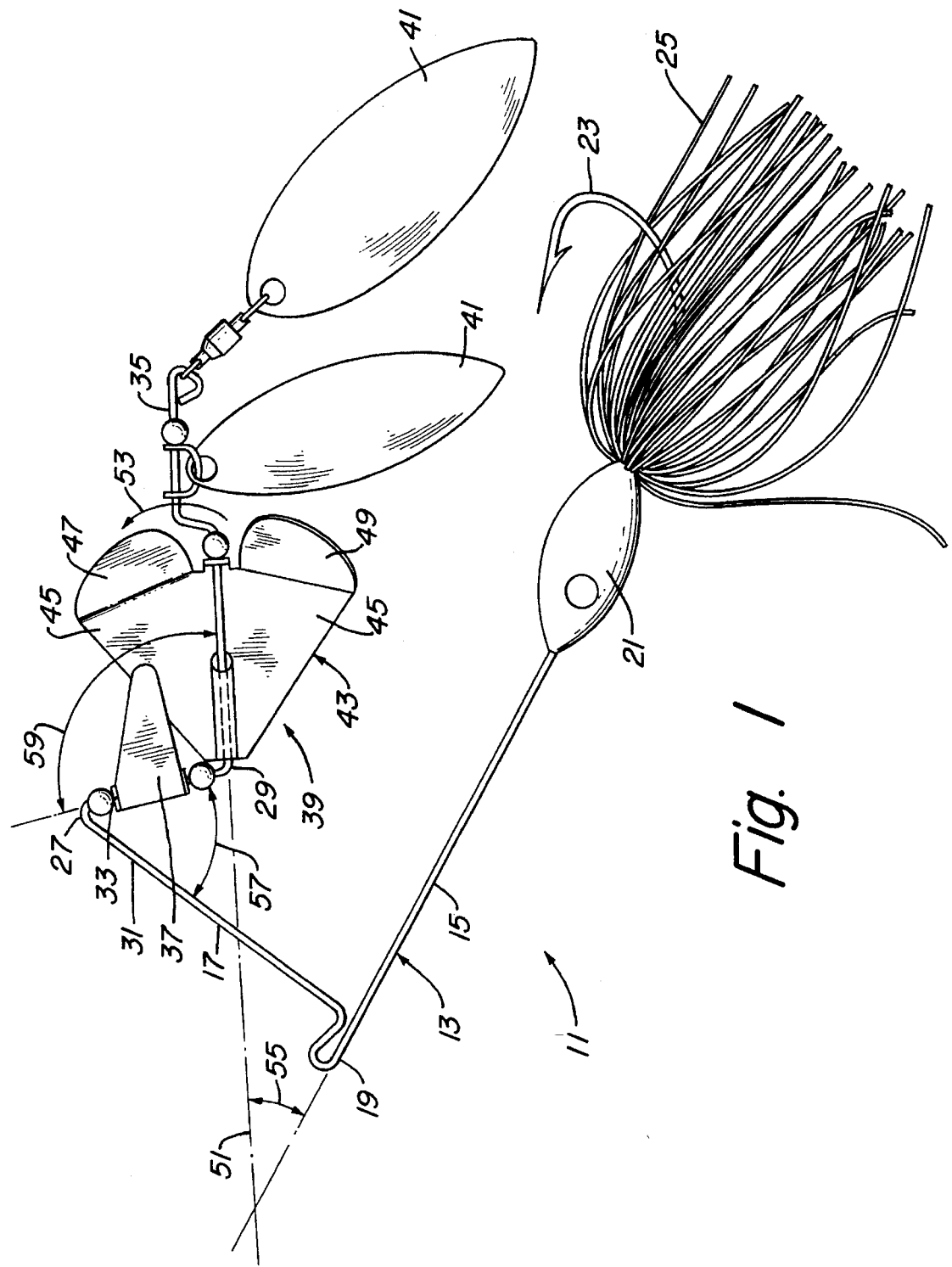
FIG. 1 is a perspective, side elevational view of a fishing lure of the present invention.

Referring to FIG. 1, fishing lure 11 is formed from wire 13, having first leg 15 and second leg 17 which rearwardly extend from an intermediate portion 19. Intermediate portion 19 is an R-type of bend, or bight, at which a fishing line is secured to fishing lure 11.

Head 21 is included as part of first leg 15 to define a minnow. Head 21 in the preferred embodiment of the present invention is a plastic coated weight from which hook 23 extends. Skirt 25 is provided by elastomeric strips, which may be of various colors. Skirt 25 conceals hook 23.

Second leg 17 includes inward bend 27 and outward bend 29 which together define three separate portions of second leg 17. The three portions include forward portion 31, central portion 33, and rearward portion 35. Inward bend 27 determines that central portion 33 rearwardly extends, inward within fishing lure 11 toward head 21 of first leg 15. Outward bend 29 determines that rearward portion 35 rearwardly extends, outward and away from head 21 of fishing lure 11.

Clicker 37 is a triangular shaped metal tab which is rotatably secured about central portion 33. Clicker 37 swivels to extend rearwardly as fishing lure 11 moves through water. Spinner 39 is secured about rearward portion 35 for rotating as it moves in water. Spinner blades 41 are metal strips which are loosely secured at the rearward end of rearward portion 35 of second leg 17 for fluttering, or wobbling, to generate vibrations within water as they are drawn through the water.

Spinner 39 includes metal blade 43 having leading coplanar surfaces 45 and end tips 47, 49. As shown in FIG. 1, end tip 47 extends downwardly into the figure, and end tip 49 extends outward from the figure. Spinner 39 rotates about an axis of rotation 51 which is coaxial to a longitudinal centerline of rearward portion 35 of second leg 17. End tips 47, 49 extend downwardly and outwardly, respectively, for urging spinner 39 to rotate in direction 53 as fishing lure 11 moves through water.

Spinner 39 is disposed at inclination angle 55 to first leg 15 for urging fishing lure 11 to submerge as spinner 39 and lure 11 are drawn through water. Angle 55 is defined by the axis of rotation 51 of spinner 39 which rearwardly inclines away from first leg 15, and also converges toward first leg 15 towards the front of fishing lure 11, in a forward direction. Inward bend 27 and outward bend 29 together determine that spinner 39 is disposed at inclination angle 55 to first leg 15 which is substantially equal to 40°. Spinner inclination angle 55 may vary from 20° to 60°. The larger the value for angle 55 and the greater the speed at which fishing lure 11 is drawn through the water, the deeper that fishing lure 11 will travel below the surface of the water.

As shown in FIG. 1, inward bend 27 defines angle 57 to be approximately 25 degress and outward bend 29 defines angle 59 to be approximately 90 degress. In this embodiment of the present invention, angle 57 is selected to position spinner 39 rearward of forward portion 31 of second leg 17 to trail forward section 31 and prevent debris from entangling around spinner 39. Angle 57 may preferably range from a few degrees to over 90 degrees. However, angle 57 should not substantially exceed 90 degrees if a substantial portion of spinner 39 will not trail rearwardly behind forward portion 31 of second leg 17 to prevent debris from entangling around spinner 39.

Angle 59 is selected so that clicker 37 will repeatedly knock against spinner 39 as fishing lure 11 is drawn through a body of water. Angles 57 and 59 are also together determine inclination angle 55, which is discussed above.

Clicker 37 and spinner 39 together provide a positively driven means for providing a clicking noise as fishing lure 11 is pulled through a body of water since spinner 39 is positively driven to rotate about rearward portion 35 of second leg 17 as fishing lure 11 is drawn through a body of water.

Operation of fishing lure 11 is now described. Fishing lure 11 is cast to a point distal from a fishing pole to which fishing lure 11 is secured. Fishing lure 11 is then reeled towards the pole at an appropriate speed to control the depth below the top surface of water at which it is desired to catch fish. As lure 11 is drawn through the water, spinner 39 rotates about rearward portion 35 and trails forward portion 31 of second leg 17. The speed at which lure 11 is drawn through the water, in combination with the spinner inclination angle 55, determines the depth at which lure 11 will pass through the water. Forward portion 31 prevents debris from becoming entangled with spinner 39.

Pulling fishing lure 11 through water pushes clicker 37 to extend rearwardly of central portion 33 of second leg 17. Clicker 37 knocks against spinner 39 to produce a clicking noise. Clicker 37 swivels around central portion 33 of leg 17 to allow spinner 39 to rotate after clicker 37 and spinner 39 come into contact. Additionally, spinner blades 41 flutter, or wobble, within the water to generate vibrations within the water for attracting fish.

The present invention provides several advantages over prior art fishing lures. A clicker engages a spinner to provide a clicking noise for attracting fish. Further, the fishing lure is submerged by the spinner which rotates when the fishing lure is moved through water. The axis of rotation of the spinner is rearwardly inclined away from the head and hook for urging the fishing lure to submerge. The depth at which the spinner moves through the water is determined by speed at which the fishing lure is drawn through the water, and the angle between the first leg and the axis of rotation of the spinner. The spinner trails a forward portion of the lure to prevent debris from becoming entangled in the spinner.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. In a fishing lure of the type having a wire formed into first and second legs which both extend in rearward directions from an intermediate section which is included within the wire between the first and second legs for securing a fishing line thereto, a head and hook included as part of the first leg, the second leg including forward and rearward portions in which the forward portion outwardly extends away from the intermediate section and the rearward portion rearwardly extends in a direction which is not substantially toward the first leg, and a spinner rotatably secured to the rearward portion for spinning about the second leg as the fishing lure is pulled through water, the improvement comprising:

a clicker secured to the second leg for repeatedly knocking against the spinner, as the spinner rotates about the second leg, to produce a clicking noise for attracting fish;

wherein the spinner is secured about the second leg for rotating about an axis of rotation which is coaxial with the rearward portion of the second leg, and rearwardly inclines away from the first leg for urging the fishing lure to submerge as the fishing lure is pulled through the water;

an inward bend included within the second leg, intermediate of the forward and rearward portions, for directing a central portion of the second leg to extend toward the first leg;

an outward bend included within the second leg between the inward bend and the rearward portion, wherein the outward bend, in combination with the inward bend, disposes the spinner rearward of the forward portion of the second leg so that most of the spinner trails the forward portion of the second leg through the water; and wherein the clicker is rotatably secured to the central portion of the second leg for swivelling about the central portion to trail the central portion and knock against the spinner as the fishing lure is pulled through the water.

2. The fishing lure according to claim 1, further comprising:

wherein the spinner is also disposed rearward of the central portion of the second leg so that most of the spinner trails the central portion of the second leg through the water.

3. In a fishing lure of the type having a wire formed into first and second legs which both extend in rearward directions from an intermediate section which is included within the wire between the first and second legs for securing a fishing line thereto, a head and hook included as part of the first leg, the second leg including forward and rearward portions in which the forward portion outwardly extends away from the intermediate section and the rearward portion rearwardly extends in a direction which is not substantially toward the first leg, and a spinner rotatably secured to the rearward portion for spinning about the second leg as the fishing lure is pulled through water, the improvement comprising:

an inward bend included within the second leg, intermediate of the forward and rearward portions, for directing a central portion of the second leg to extend toward the first leg;

an outward bend included within the second leg between the inward bend and the rearward portion, wherein the outward bend, in combination with the inward bend, disposes the spinner rearward of the forward portion of the second leg so that the spinner trails the forward and central portions of the second leg through the water; and a clicker rotatably mounted on the central portion of the second leg for swivelling rearward from the central portion to knock against the spinner to produce a clicking noise as the fishing lure moves through the water and the spinner rotates about the rearward portion of the second leg.

4. The fishing lure according to claim 3, further comprising:

the inward bend defining an inwardly disposed angle between the forward and central portions of the second leg, wherein the inwardly disposed angle does not measure more than approximately 90 degrees.

5. The fishing lure according to claim 3, further comprising;

wherein the inward bend defines an inwardly disposed angle between the forward and central portions of the second leg, and the inwardly disposed angle does not measure more than approximately 90 degrees; and wherein the inward and outward bends together dispose the rearward portion of the second leg about which the spinner rotates to rearwardly extend in a direction which is substantially away from a line projected coaxially through the first leg, for adapting the spinner to urge the fishing lure to submerge when the spinner rotates about the second leg as the lure is pulled through the water.

6. The fishing lure according to claim 3, further comprising;

wherein the inward bend defines an inwardly disposed angle between the forward and central portions of the second leg, and the inwardly disposed angle does not measure more than approximately 90 degrees;

wherein the inward and outward bends together dispose the rearward portion of the second leg about which the spinner rotates to rearwardly extend at an inclination angle from a line projected coaxially through the first leg; and wherein said inclination angle substantially measures 40 degrees for adapting the spinner to urge the fishing lure to submerge when the spinner rotates about the second leg as the lure is pulled through the water.

7. The fishing lure according to claim 3, further comprising;

wherein the clicker is formed from a strip of metal;

wherein the inward bend defines an inwardly disposed angle between the forward and central portions of the second leg, and the inwardly disposed angle does not measure more than approximately 90 degrees;

wherein the inward and outward bends together dispose the rearward portion of the second leg about which the spinner rotates to rearwardly extend in a direction which is substantially away from a line projected coaxially through the first leg, for adapting the spinner to urge the fishing lure to submerge when the spinner rotates about the second leg as the lure is pulled through the water;

strips forming a skirt which are secured to the fishing lure and extend about the hook; and spinner blades which are secured to a rearward end of the second leg for fluttering to generate vibrations within the water for attracting fish as the fishing lure is moving through the water.

8. The fishing lure according to claim 3, further comprising;

wherein the clicker is formed from a strip of metal;

wherein the inward bend defines an inwardly disposed angle between the forward and central portions of the second leg, and the inwardly disposed angle does not measure more than approximately 90 degrees;

wherein the inward and outward bends together dispose the rearward portion of the second leg about which the spinner rotates to rearwardly extend in a direction at an inclination angle to a line projected coaxially through the first leg which substantially measures 40 degrees, for adapting the spinner to urge the fishing lure to submerge when the spinner rotates about the second leg as the lure is pulled through the water; and strips forming a skirt which are secured to the fishing lure and extend about the hook; and spinner blades which are secured to a rearward end of the second leg for fluttering to generate vibrations within the water for attracting fish as the fishing lure is moving through the water.

* * * * *